United States Patent
Ebrahimi Afrouzi

(10) Patent No.: US 11,919,172 B1
(45) Date of Patent: *Mar. 5, 2024

(54) METHOD TO MINIMIZE COLLISIONS OF MOBILE ROBOTIC DEVICE

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,225

(22) Filed: Jul. 1, 2021

Related U.S. Application Data

(63) Continuation of application No. 16/241,934, filed on Jan. 7, 2019, now Pat. No. 11,077,555, which is a continuation-in-part of application No. 15/286,911, filed on Oct. 6, 2016, now Pat. No. 10,207,408.

(60) Provisional application No. 62/264,194, filed on Dec. 7, 2015.

(51) Int. Cl.
*B25J 9/16* (2006.01)

(52) U.S. Cl.
CPC ............ *B25J 9/1666* (2013.01); *B25J 9/163* (2013.01)

(58) Field of Classification Search
CPC ................. B25J 9/1666; B25J 9/163
See application file for complete search history.

(56) References Cited

U.S. PATENT DOCUMENTS

| | | | |
|---|---|---|---|
| 5,995,884 A * | 11/1999 | Allen | G05D 1/0238 701/25 |
| 6,678,582 B2 | 1/2004 | Waled | |
| 7,441,298 B2 | 10/2008 | Svendsen | |
| 7,474,941 B2 | 1/2009 | Kim | |
| 7,861,365 B2 | 1/2011 | Sun | |
| 7,952,470 B2 | 5/2011 | Liao | |
| 9,320,398 B2 | 4/2016 | Hussey | |
| 2007/0017061 A1 | 1/2007 | Yan | |
| 2017/0213151 A1 | 7/2017 | Uchibe | |
| 2017/0332862 A1* | 11/2017 | Jun | A47L 11/4069 |
| 2018/0079076 A1 | 3/2018 | Toda | |

FOREIGN PATENT DOCUMENTS

JP 2010165050 A * 7/2010

* cited by examiner

*Primary Examiner* — Dale Moyer

(57) ABSTRACT

Provided is a mobile robotic device, including at least: a plurality of sensors; a processor; and a tangible, non-transitory, machine readable medium storing instructions that when executed by the processor effectuates operations comprising: selecting, by the processor, one or more actions to navigate through a workspace, wherein each action transitions the mobile robotic device from a current state to a next state; actuating, by the processor, the mobile robotic device to execute the selected one or more actions; detecting, by the processor, whether a collision is incurred by the mobile robotic device for each action executed; and, assigning, by the processor, each collision to a location within a map of the workspace wherein the location corresponds to where the respective collision occurred.

17 Claims, 2 Drawing Sheets

METHOD TO MINIMIZE COLLISIONS OF MOBILE ROBOTIC DEVICE

CROSS-REFERENCE TO RELATED APPLICATIONS

This is a continuation of U.S. Non-Provisional patent application Ser. No. 16/241,934, filed Jan. 7, 2019, which is a continuation-in-part of U.S. Non-Provisional patent application Ser. No. 15/286,911, filed Oct. 6, 2016, which claims the benefit of U.S. Provisional Patent Application No. 62/264,194, filed Dec. 7, 2015, each of which is herein incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 16/185,000, 62/681,965, 62/614,449, 62/746, 688, 62/740,573, 62/740,580, 15/955,480, 15/425,130, 15/955,344 16/163,530, 16/239,410, 16/041,286, 15/406, 890, and 14/673,633, are hereby incorporated by reference in their entirety. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

Aspects of the invention relate to methods for improving navigation of mobile robotic devices. More particularly, aspects of the invention relate to reducing collisions of mobile robotic devices with obstacles and preventing mobile robotic devices from getting stuck during operation.

BACKGROUND

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Robotic devices may be generally used in a variety of applications for carrying out tasks autonomously. Problems robotic devices face include avoiding collisions while driving through an environment and getting stuck in locations of the environment during operation. A robotic surface coverage device may drive through an area faster when fewer collisions are incurred or when getting stuck in a location (e.g., a corner of a room or between two or more obstacles) is prevented. Thus, a job of a robotic surface coverage device may be completed more efficiently. A need exists for a method for mobile robotic devices to reduce the rate of collisions with obstacles and prevent getting stuck in locations during operation.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a mobile robotic device, including at least: a plurality of sensors; a processor; and a tangible, non-transitory, machine readable medium storing instructions that when executed by the processor effectuates operations comprising: selecting, by the processor, one or more actions to navigate through a workspace, wherein each action transitions the mobile robotic device from a current state to a next state; actuating, by the processor, the mobile robotic device to execute the selected one or more actions; detecting, by the processor, whether a collision is incurred by the mobile robotic device for each action executed; and, assigning, by the processor, each collision to a location within a map of the workspace wherein the location corresponds to where the respective collision occurred.

Provided is a tangible, non-transitory, machine readable medium storing instructions that when executed by a processor of a mobile robotic device effectuates operations including: selecting, by the processor, one or more actions to navigate through a workspace, wherein each action transitions the mobile robotic device from a current state to a next state; actuating, by the processor, the mobile robotic device to execute the selected one or more actions; detecting, by the processor, whether a collision is incurred by the mobile robotic device for each action executed; and, assigning, by the processor, each collision to a location within a map of the workspace wherein the location corresponds to where the respective collision occurred.

DETAILED DESCRIPTION OF SOME EMBODIMENTS

Figure 1:
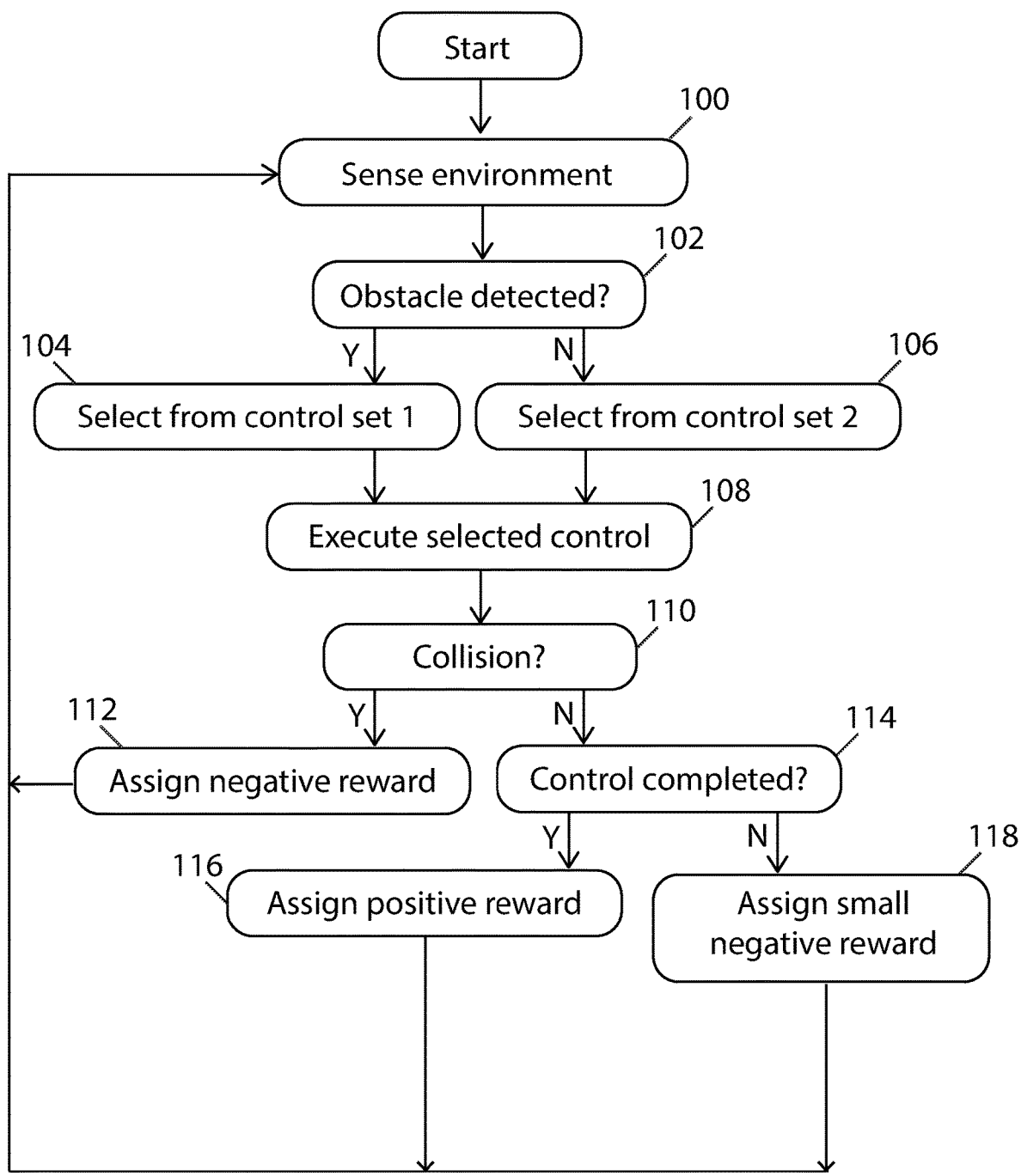
FIG. 1 illustrates the process of assigning rewards based on the outcome of an action embodying features of the present invention.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions may be practiced without some or all of these specific details. In other instances, well known process steps and/or structures have not been described in detail in order to not unnecessarily obscure the present inventions. Further, it should be emphasized that several inventions are described, and embodiments are not limited to systems implementing all of those inventions, as various cost and engineering trade-offs may warrant systems that only afford a subset of the benefits described herein or that will be apparent to one of ordinary skill in the art.

Some embodiments provide a method for improving decision-making of a mobile robotic device over time so that collisions with obstacles may be reduced by defining a policy based on outcomes of prior actions. Briefly, a mobile robotic device may service a work area using a number of movements or actions. Actions result either when the device collides with an obstacle or when the device does not collide with an obstacle. Whenever a collision occurs, a negative reward is assigned by a control system of the mobile robotic device. Whenever a non-collision occurs following an action, a positive reward is assigned by the control system. The control system may be configured to maximize rewards by selecting actions that produce a lower rate of collisions. In some embodiments, the control system may develop a policy to minimize collisions over time based on the total rewards earned during each work session.

In some embodiments, a control system of a mobile robotic device is provided with a variety of actions from which it may select to navigate through an environment. The mobile robotic device transitions from a current state (e.g., a particular location in an environment) to a next state by executing an action. In some embodiments, the control system selects actions, in part, based on input from sensors. For example, a control system of a mobile robotic device that has received input from a leftmost obstacle sensor may be configured to only select from actions that do not begin with leftward or forward movement. However, actions may also be selected, in part, at random. A control system of a mobile robotic device that has not received input from sensors may select an action from a list of possible actions without regard to the directionality of the robot's initial movements. After selecting an action, the control system actuates the mobile robotic device to execute the action. If, during execution of the action, the mobile robotic device collides with an obstacle as detected by one or more touch sensors, for example, a negative reward is assigned by the control system to the action executed from the particular state. In some embodiments, if the action is interrupted before completion, for example, by a moving obstacle, but no collision occurs, a smaller negative reward is assigned. In some embodiments, if the action is completed without any collisions, a positive reward is assigned. The control system of the mobile robotic device repeats this process to select actions to move through the environment.

Execution of each action results in the transition from a current state to a next state. The control system may represent the reward (R) of each state (s) by:

$$R_{(s)} = R_{(ts)} \gamma^t$$

Where t is discrete time and $\gamma$ is a discount factor.

The control system may represent the reward after the transition from state (s) to (s') by:

$$R_{(s')} = R_{(ts)} \gamma^t + R_{(ts+1)} \gamma^{t+1}$$

The control system may combine the cumulative rewards over the course of a work session to determine the payoff of the arrangement of actions executed. The control system may represent the total reward for a collection of actions executed during a work session by:

$$R_{(t0)} \gamma^t + R_{(t1)} \gamma^t + R_{(t2)} \gamma^t + R_{(t3)} \gamma^t + \ldots + R_{(tn)} \gamma^t = \text{Total Reward}$$

The control system may be configured to attempt to maximize this value at all times, which is represented by the formula:

$$E[\Sigma \gamma^t R_t] \rightarrow \text{Max}$$

Where E is the expectation that R (reward) is maximized.

Therefore, the value of state (s) when policy ($\pi$) is executed equals the expected sum of all future discounted rewards provided that the initial state ($s_0$) is (s) and policy ($\pi$) is executed as represented by the formula:

$$\pi_{(s)} V = E \pi_t [\sum \gamma^t R_t \mid s_0 = s]$$

From the above, the control system may conclude a value iteration:

$$V_{(s)} = [\max_{a_s} \gamma \Sigma P(s|s,a) V_{(s')}] + R_{(s)}$$

Where:
$\max_a$ = maximizing action
$V_{(s')}$ = value of successor
$R_{(s)}$ = reward or cost to get to state s
P = state transition function
R = reward function The control system may find the above formula after convergence according to Bellman's equation represented by the formula:

$$\max \sum_{t=0}^{\infty} \beta^t \mu(c_t) \text{ subject to}$$

$$a_{t+1} = (1 + r)(a_t - c_t), ct \geq 0, \text{ and}$$

$$\lim_{t=\infty} a_t \geq 0, \text{ and}$$

$$V(a) = \max\{\mu(c) + \beta V((1 + r)a - c))\}$$

The value of a given state depends on the outcome of the prior state multiplied by the cost (penalty incurred) to get there. The control system can then compare the reward values of the actions executed in each session and determine which set of actions results in the highest total reward value. As the control system completes more sessions, more and more data is gathered and reward values of more actions executed from each state are determined. Once rewards values have been assigned to different sets of actions, the system can determine the policy that maximizes the total reward. The system develops a policy that defines the best set of actions yet discovered. This is represented by the formula, $$\pi(s) = \underset{s'}{\operatorname{argmax}} \sum P(s' \mid s_1 a) V(s')$$

In some embodiments, from the value iteration, the control system may find policy 1, which is a better policy than policy 0 and then find a policy 2, which is a better than policy 1 and so on. The above formula therefore finds the best eventual policy.

In some embodiments, the control system may use the formula, Pa (s,s') Pr(st+1=s'|st=s, at=a) to determine the probability that action a in state s at time t will lead to state s' at time t+1. And $R_a$ (s,s') is the immediate reward received after transition to state s' from s. And $\gamma \in [0,1]$ is the discount factor.

A desirable outcome may be to choose a policy ($\pi$) that will maximize the expected discounted sum of the rewards collected at any given state (s). The control system uses the policy ($\pi$) to move through the environment in the best known mine.

In this method, s (state) refers to the state of the device after each action. A finite number of actions are possible;

thus, there are a finite number of resulting states. a is the action or action selected, which takes the device from state s to state s'.

FIG. 1 illustrates an example of a process the control system uses to assign rewards based on the outcome of an action. In a first step 100, the control system senses the environment through one or more sensors. In a next step 102, the control system determines whether an obstacle has been detected. If an obstacle has been detected, the control system proceeds to a next step 104 to select an action from a first set of actions. If an obstacle is not detected in step 102, the control system proceeds to a next step 106 to select an action from a second set of actions. Then the control system proceeds to a step 108 to execute the selected action. In a next step 110, the control system determines whether a collision occurred. If a collision occurred, the control system proceeds to a next step 112 to assign a negative reward to the work session. If a collision did not occur, the control system proceeds to a next step 114 to determine if the action was completed. If the action was completed, the control system proceeds to a next step 116 to assign a positive reward to the work session. If the action was not completed, the control system proceeds to a next step 118 to assign a small negative reward to the work session. The control system proceeds by restarting the cycle beginning from step 100.

Figure 2:
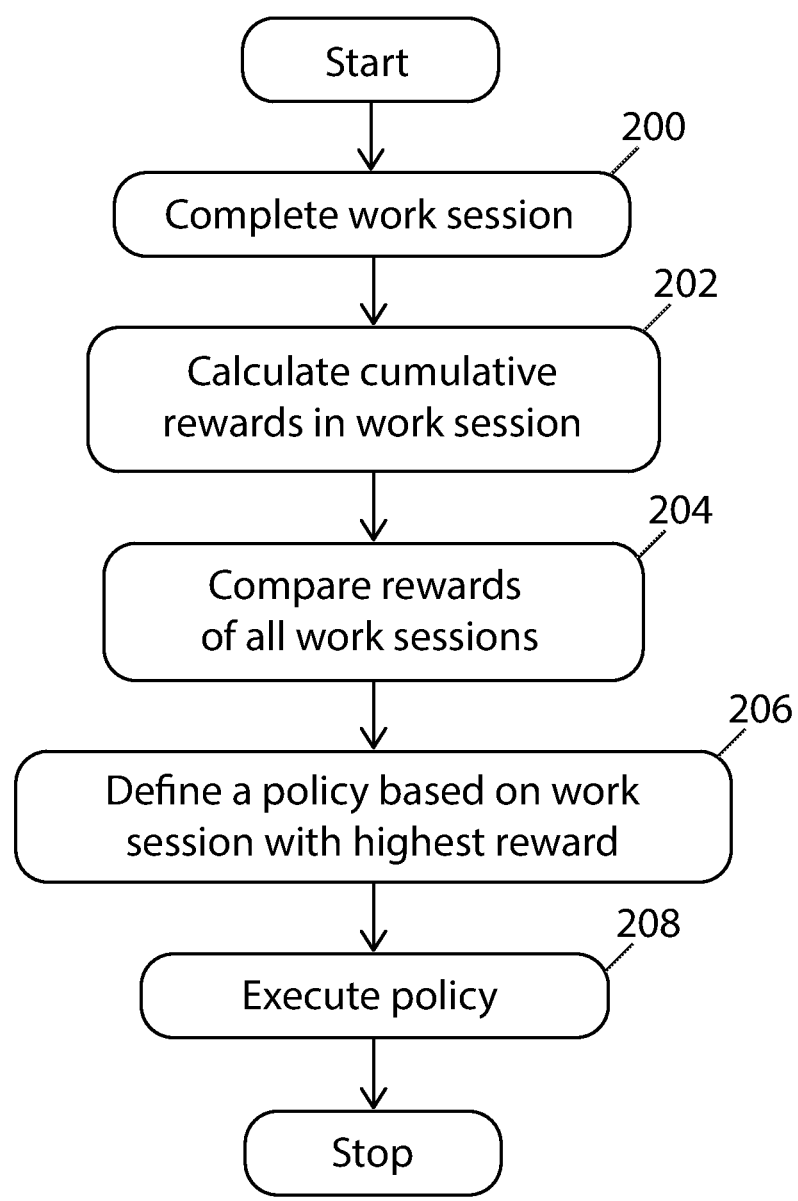
FIG. 2 illustrates the process of defining a policy to maximize rewards embodying features of the present invention.

FIG. 2 illustrates an example of a process for defining a policy to maximize rewards. The process begins when a mobile robotic device has completed a work session in a first step 200. The control system then proceeds to a next step 202 to calculate the cumulative rewards earned in the completed work session. The control system then proceeds to a next step 204 to compare the cumulative rewards of all work sessions. The control system then proceeds to a next step 206 to define a policy based on the work session with the greatest cumulative rewards. The control system then proceeds to a next step 208 to execute the defined policy.

In some embodiments, the state of the mobile robotic device includes its location within the environment. In some embodiments, the system reviews all previous actions executed from the current state of the mobile robotic device and chooses to execute the action that previously resulted in a reward, in some embodiments, the system reviews all previous actions executed from a collection of states beginning with the current state of the mobile robotic device to choose a collection of actions that result in the highest reward. Over time, as more actions are executed from each state, the system converges to the collections of actions that result in the highest reward. In some embodiments, the control system uses the collection of actions that result in the highest reward in conjunction with a map of the environment to further minimize collisions. In some embodiments, the control system uses the method of determining actions that result in the highest reward to prevent the mobile robotic device from becoming stuck during operation wherein the mobile robotic device repeatedly transitions between the same collection of states (e.g., a collection of between two to ten states).

In some embodiments, the control system assigns locations of collisions to a map of the environment. Examples of methods for mapping an environment are described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. Examples of methods for determining a location of a robotic device are described in U.S. Patent Application Nos. 62/746,688, 62/740,573, 62/740,580, 15/955,480, 15/425,130, and 15/955,344, the entire contents of which are hereby incorporated by reference. In some embodiments, the control system aggregates collision data of two or more maps of the environment that correspond to two or more work sessions. In some embodiments, the control system uses the same map of the environment to mark locations of collisions that occur in different work sessions, in some embodiments, the control system determines a movement path of the mobile robotic device based on previous collisions marked within the map of the environment to avoid collisions or becoming stuck in areas of the environment, in some embodiments, the control system uses similar reward system as described above for determining the movement path of the mobile robotic device. Examples of methods for determining actions of a robotic device (e.g., movement path) based on characteristics (e.g., collisions, level of accumulated debris, type of floor) marked within a generated map of the environment are described, in U.S. patent application Ser. Nos. 16/163,530 and 16/239,410, the entire contents of which are hereby incorporated by reference. In some embodiments, the control system considers additional factors, from collisions, in determining the movement path of the mobile robotic device. Examples of methods for determining a movement path of a robotic device are described in U.S. patent application Ser. Nos. 16/041,286, 15/406,890, and 14/673,633, the entire contents of which are hereby incorporated by reference.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A mobile robotic device, comprising at least:
a plurality of sensors;
a processor; and
a tangible, non-transitory, machine readable medium storing instructions that when executed by the processor effectuates operations comprising:
selecting, by the processor, one or more actions to navigate through a workspace, wherein:
each action transitions the mobile robotic device from a current state to a next state; and
each state of the mobile robotic device comprises at least a location of the mobile robotic device within the workspace;
actuating, by the processor, the mobile robotic device to execute the selected one or more actions;
detecting, by the processor, whether a collision is incurred by the mobile robotic device for each action executed;
detecting, by the processor, whether the mobile robotic device is repeatedly transitioning between a same collection of states;

determining, by the processor, the mobile robotic device is stuck when the mobile robotic device is repeatedly transitioning between the same collection of states; and, assigning, by the processor, each collision to a location within a map of the workspace wherein the location corresponds to where the respective collision occurred.

2. The mobile robotic device of claim 1, wherein the collection of states includes two to ten different states.

3. The mobile robotic device of claim 1, wherein the operations further comprise:
selecting, by the processor, one or more actions to navigate the mobile robotic device to a state not included in the collection of states.

4. The mobile robotic device of claim 3, wherein the mobile robotic device transitions to one or more states within the collection of states to reach the state not included in the collection of states.

5. The mobile robotic device of claim 1, wherein the operations further comprise: calculating and assigning, by the processor, a reward for each action executed based on collisions incurred by the mobile robotic device and completion of the action.

6. The mobile robotic device of claim 1, wherein locations of collisions within the map of the workspace correspond to collisions that occurred during one or more work sessions.

7. The mobile robotic device of claim 1, wherein the operations further comprise: determining, by the processor, a movement path of the mobile robotic device based on locations of previous collisions and a number of previous collisions at different locations within the map of the workspace.

8. The mobile robotic device of claim 1, wherein the one or more actions is selected based on at least one of: at least a portion of the data collected by the plurality of sensors, locations of previous collisions, locations of obstacles, level of debris accumulation in different areas, and floor type in different areas.

9. The mobile robotic device of claim 1, wherein selecting the one or more actions further comprises:
reviewing, by the processor, all previous actions executed from the current state of the mobile robotic device; and
selecting, by the processor, the one or more actions that previously resulted in a highest reward.

10. The mobile robotic device of claim 1, wherein selecting the one or more actions further comprises:
reviewing, by the processor, all previous actions executed from a collection of states beginning with the current state of the mobile robotic device;
calculating, by the processor, a total reward for different collections of states and actions; and
selecting, by the processor, a collection of states and actions resulting in a highest reward.

11. The mobile robotic device of claim 1, wherein the operations further comprise:
determining, by the processor, a total reward value for the one or more actions executed and corresponding states visited during the work session;
assigning, by the processor, the total reward value to a policy comprised of the one or more actions executed and corresponding states visited during the work session; and
iteratively generating new policies, by the processor, until a policy that exceeds a predetermined total reward value is generated.

12. A tangible, non-transitory, machine readable medium storing instructions that when executed by a processor of a mobile robotic device effectuates operations comprising:
selecting, by the processor, one or more actions to navigate through a workspace, wherein:
each action transitions the mobile robotic device from a current state to a next state; and
each state of the mobile robotic device comprises at least a location of the mobile robotic device within the workspace;
actuating, by the processor, the mobile robotic device to execute the selected one or more actions;
detecting, by the processor, whether a collision is incurred by the mobile robotic device for each action executed;
detecting, by the processor, whether the mobile robotic device is repeatedly transitioning between a same collection of states;
determining, by the processor, the mobile robotic device is stuck when the mobile robotic device is repeatedly transitioning between the same collection of states; and,
assigning, by the processor, each collision to a location within a map of the workspace wherein the location corresponds to where the respective collision occurred.

13. The medium of claim 12, wherein the operations further comprise:
selecting, by the processor, one or more actions to navigate the mobile robotic device to a state not included in the collection of states.

14. The medium of claim 13, wherein the mobile robotic device transitions to one or more states within the collection of states to reach the state not included in the collection of states.

15. The medium of claim 12, wherein locations of collisions within the map of the workspace correspond to collisions that occurred during one or more work sessions.

16. The medium of claim 12, wherein the operations further comprise:
determining, by the processor, a movement path of the mobile robotic device based on locations of previous collisions and a number of previous collisions at different locations within the map of the workspace.

17. The medium of claim 12, wherein:
the one or more actions is selected based on at least one of: at least a portion of the data collected by a plurality of sensors of the mobile robotic device, locations of previous collisions, locations of obstacles, a level of debris accumulation in different areas, and a floor type in different areas.

* * * * *